(12) United States Patent
Andino et al.

(10) Patent No.: US 12,115,497 B2
(45) Date of Patent: Oct. 15, 2024

(54) SYSTEMS AND METHODS FOR SIMULTANEOUS CONTROL OF CARBON DIOXIDE AND NITRIC OXIDE AND GENERATION OF NITROUS OXIDE

(71) Applicant: ARIZONA BOARD OF REGENTS ON BEHALF OF ARIZONA STATE UNIVERSITY, Scottsdale, AZ (US)

(72) Inventors: Jean Andino, Chandler, AZ (US); Selisa Rollins Andrus, Mesa, AZ (US)

(73) Assignee: ARIZONA BOARD OF REGENTS ON BEHALF OF ARIZONA STATE UNIVERSITY, Scottsdale, AZ (US)

(*) Notice: Subject to any disclaimer, the term of this patent is extended or adjusted under 35 U.S.C. 154(b) by 977 days.

(21) Appl. No.: 16/098,309

(22) PCT Filed: May 2, 2017

(86) PCT No.: PCT/US2017/030499
§ 371 (c)(1),
(2) Date: Nov. 1, 2018

(87) PCT Pub. No.: WO2017/192484
PCT Pub. Date: Nov. 9, 2017

(65) Prior Publication Data
US 2020/0306691 A1    Oct. 1, 2020

Related U.S. Application Data

(60) Provisional application No. 62/330,533, filed on May 2, 2016.

(51) Int. Cl.
*B01D 53/86* (2006.01)
*B01J 21/06* (2006.01)
(Continued)

(52) U.S. Cl.
CPC ..... *B01D 53/8628* (2013.01); *B01D 53/8671* (2013.01); *B01J 21/063* (2013.01);
(Continued)

(58) Field of Classification Search
None
See application file for complete search history.

(56) References Cited

U.S. PATENT DOCUMENTS 9,545,625 B2    1/2017  Andino
2006/0210798 A1  9/2006  Burda
2007/0230181 A1 10/2007  Fujishima

OTHER PUBLICATIONS

Tobaldi et al., Fully quantitative X-ray characterization of Evonik Aeroxide TiO2 P25®, Materials Letters, 2014, 122, 345-347 (Year: 2014).*

(Continued)

*Primary Examiner* — Coris Fung
*Assistant Examiner* — Keling Zhang
(74) *Attorney, Agent, or Firm* — Quarles & Brady, LLP

(57) ABSTRACT

Systems and methods for simultaneous control of carbon dioxide and nitric oxide and generation of nitrous oxide are provided. In particular, the present invention provides systems and methods utilizing a titania-based photocatalyst to simultaneously control carbon dioxide and nitric oxide levels generated by combustion systems. Additionally, photoreduction of nitric oxide provided by the photocatalyst is used to generate nitrous oxide.

16 Claims, 7 Drawing Sheets

(51) Int. Cl.
| | |
|---|---|
| *B01J 23/72* | (2006.01) |
| *B01J 27/135* | (2006.01) |
| *B01J 35/39* | (2024.01) |
| *B01J 35/61* | (2024.01) |
| *B01J 37/02* | (2006.01) |

(52) U.S. Cl.
CPC ............. *B01J 23/72* (2013.01); *B01J 27/135* (2013.01); *B01J 35/39* (2024.01); *B01J 35/613* (2024.01); *B01J 37/0201* (2013.01); *B01D 2255/20707* (2013.01); *B01D 2255/20761* (2013.01); *B01D 2255/802* (2013.01); *B01D 2257/404* (2013.01); *B01D 2257/504* (2013.01); *B01D 2258/0283* (2013.01); *B01D 2259/804* (2013.01)

(56) References Cited

OTHER PUBLICATIONS

Luttrell et al., Why is anatase a better photocatalyst than rutile?—Model studies on epitaxial TiO2 films, Sci Rep 4, 2014, 4043 (Year: 2014).*
Wang, Wei-Ning, et al. "Comparison of CO2 photoreduction systems: a review." Aerosol Air Qual. Res 14.2 (2014): 533-549.
Wu, J. CS., et al. "In situ FTIR study of photocatalytic NO reaction on photocatalysts under UV irradiation." Journal of Catalysis 237.2 (2006): 393-404.
Wu, Qingping, et al. "Selective photoreduction of nitric oxide to nitrogen by nanostructured TiO2 photocatalysts: role of oxygen vacancies and iron dopant." Journal of the American Chemical Society 134.22 (2012): 9369-9375.
Yamashita, Hiromi, et al. "Photocatalytic decomposition of NO at 275 K on titanium oxides included within Y-zeolite cavities: The structure and role of the active sites." The Journal of Physical Chemistry 100.40 (1996): 16041-16044.
Zhang, Qianyi, et al. "Copper and iodine co-modified TiO2 nanoparticles for improved activity of CO2 photoreduction with water vapor." Applied Catalysis B: Environmental 123 (2012): 257-264.
Anpo, M., et al. "Design and development of titanium and vanadium oxide photocatalysts incoroprated within zeolite cavities and their photocatalytic reactivities." Journal of Industrial and Engineering Chemistry 6.2 (2000): 59-71.
Anpo, M., et al. "Photocatalytic reduction of CO2 with H2O on various titanium oxide catalysts." Journal of Electroanalytical Chemistry 396.1-2 (1995): 21-26.
Aresta, M. et al. "Utilisation of CO 2 as a chemical feedstock: opportunities and challenges." Dalton Transactions 28 (2007): 2975-2992.
Bai, Ling, et al. "Permanent gas analysis using gas chromatography with vacuum ultraviolet detection." Journal of Chromatography A 1388 (2015): 244-250.
Boccuzzi, Flora, et al. "Nitric oxide reduction by CO on Cu/TiO2 catalysts." Journal of Catalysis 146.2 (1994): 449-459.
Bowering, Neil, et al. "Silver modified Degussa P25 for the photocatalytic removal of nitric oxide." International Journal of Photoenergy 2007 (2007).
Bowering, N. et al. "Photocatalytic decomposition and reduction reactions of nitric oxide over Degussa P25." Applied Catalysis B: Environmental62.3-4 (2006): 208-216.
Centi, G. et al. "Catalysis: role and challenges for a sustainable energy." Topics in Catalysis 52.8 (2009): 948-961.
Centi, G. et al. "Nature of active species in copper-based catalysts and their chemistry of transformation of nitrogen oxides." Applied Catalysis A: General 132.2 (1995): 179-259.
Centi, G. et al. "Opportunities and prospects in the chemical recycling of carbon dioxide to fuels." Catalysis Today 148.3-4 (2009): 191-205.
Centi, Gabriele, et al. "Electrocatalytic conversion of CO 2 to long carbon-chain hydrocarbons." Green Chemistry 9.6 (2007): 671-678.

Courbon, H. et al. "Room-temperature interaction of N 18 O with ultraviolet-illuminated titanium dioxide." Journal of the Chemical Society, Faraday Transactions 1: Physical Chemistry in Condensed Phases80.11 (1984): 3175-3185.
D'Alessandro, D.M. et al. "Carbon dioxide capture: prospects for new materials." Angewandte Chemie International Edition 49.35 (2010): 6058-6082.
Das, S. et al. Photocatalytic CO2 transformation into fuel: A review on advances in photocatalyst and photoreactor. Renewable & Sustainable Energy Reviews 39 (2014): 765-805.
Debeila, M. A., et al. "DRIFTS studies of the interaction of nitric oxide and carbon monoxide on Au—TiO2." Catalysis today 72.1-2 (2002): 79-87.
Diebold, Ulrike. "The surface science of titanium dioxide." Surface science reports 48.5-8 (2003): 53-229.
Fan, Hui, et al. "Gas chromatography-vacuum ultraviolet spectroscopy for multiclass pesticide identification." Journal of Chromatography A 1389 (2015): 120-127.
Gong, X.-Q. et al. "Role of steps in the reactivity of the anatase TiO2 (101) surface." Journal of catalysis 249.2 (2007): 134-139.
Gong, Xue-Qing, et al. "Steps on anatase TiO 2 (101)." Nature materials 5.8 (2006): 665.
He, H. et al. "A theoretical study of CO2 anions on anatase (101) surface." The Journal of Physical Chemistry C 114.49 (2010): 21474-21481.
He, H. et al. "Computational screening of dopants for photocatalytic two-electron reduction of CO2 on anatase (101) surfaces." Energy & Environmental Science 5.3 (2012): 6196-6205.
Hurum, Deanna C., et al. "Explaining the enhanced photocatalytic activity of Degussa P25 mixed-phase TiO2 using EPR." The Journal of Physical Chemistry B 107.19 (2003): 4545-4549.
Hurum, Deanna C., et al. "Recombination pathways in the Degussa P25 formulation of TiO2: surface versus lattice mechanisms." The Journal of Physical Chemistry B 109.2 (2005): 977-980.
International Search Report and Written Opinion for Application PCT/US2017/030499, mailing date Aug. 10, 2017.
Izumi, Yasuo. "Recent advances in the photocatalytic conversion of carbon dioxide to fuels with water and/or hydrogen using solar energy and beyond." Coordination Chemistry Reviews 257.1 (2013): 171-186.
Kantcheva, Margarita M., et al. "Low-temperature CO adsorption on Cu2+/TiO2 catalysts." Applied surface science55.1 (1992): 49-55.
Kawase, R. et al. "Decomposition analysis of CO2 emission in long-term climate stabilization scenarios." Energy Policy 34.15 (2006): 2113-2122.
De Richter, R. K. et al. "Fighting global warming by photocatalytic reduction of CO2 using giant photocatalytic reactors." Renewable and Sustainable Energy Reviews 19 (2013): 82-106.
Komova, O. V., et al. "Investigation of the state of copper in supported copper-titanium oxide catalysts." Journal of Molecular Catalysis A: Chemical 161.1-2 (2000): 191-204.
Lari, Giacomo M., et al. "The use of carbon monoxide as a probe molecule in spectroscopic studies for determination of exposed gold sites on TiO 2." Physical Chemistry Chemical Physics 17.35 (2015): 23236-23244.
Asek, J. et al. "Removal of NOx by photocatalytic processes." Journal of Photochemistry and Photobiology C: Photochemistry Reviews 14 (2013): 29-52.
Ast, G. V. et al. Identification and selection of major carbon dioxide stream compositions. No. PNNL-20493. Pacific Northwest National Lab.(PNNL), Richland, WA (United States), 2011.
Lee, J.-Y. et al. "Impacts of flue gas impurities in sequestered CO2 on groundwater sources: A process analysis and implications for risk management." (2009).
Lee, J.-Y. et al. "Potential flue gas impurities in carbon dioxide streams separated from coal-fired power plants." Journal of the Air & Waste Management Association 59.6 (2009): 725-732.
Lisachenko, Andrei A., et al. "Photocatalytic reduction of NO by CO on titanium dioxide under visible light irradiation." The Journal of Physical Chemistry C 111.39 (2007): 14440-14447.
Liu, L. et al, "Spontaneous dissociation of CO2 to CO on defective surface of Cu (I)/TiO2-x nanoparticles at room temperature." Journal of Physical Chemistry C 116 (2012) 7904-7912.

(56) References Cited

OTHER PUBLICATIONS

Liu, L. et al. "Understanding the reaction mechanism of photocatalytic reduction of CO2 with H2O on TiO2-based photocatalysts: a review." Aerosol Air Qual Res14.2 (2014): 453-469.

Liu, Lianjun, et al. "Photocatalytic CO2 reduction with H2O on TiO2 nanocrystals: Comparison of anatase, rutile, and brookite polymorphs and exploration of surface chemistry." ACS Catalysis 2.8 (2012): 1817-1828.

Liu, Lianjun, et al. "Tailoring Cu valence and oxygen vacancy in Cu/TiO2 catalysts for enhanced CO2 photoreduction efficiency." Applied Catalysis B: Environmental 134 (2013): 349-358.

Ma, Yi, et al. "Titanium dioxide-based nanomaterials for photocatalytic fuel generations." Chemical reviews 114.19 (2014): 9987-10043.

Mattsson, A. et al. "Adsorption and photoinduced decomposition of acetone and acetic acid on anatase, brookite, and rutile TiO2 nanoparticles." The Journal of Physical Chemistry C 114.33 (2010): 14121-14132.

Rodriguez, Monique M., et al. "A density functional theory and experimental study of CO2 interaction with brookite TiO2." The Journal of Physical Chemistry C 116.37 (2012): 19755-19764.

Ryan, S. M. et al. "Global warming potential of inhaled anesthetics: application to clinical use." Anesthesia & Analgesia 111.1 (2010): 92-98.

Schug, Kevin A., et al. "Vacuum ultraviolet detector for gas chromatography." Analytical chemistry 86.16 (2014): 8329-8335.

Solymosi, F. et al. "Infrared study of the NO+ CO interaction over Au/TiO 2 catalyst." Catalysis letters 87.1-2 (2003): 7-10.

Song, Chunshan. "Global challenges and strategies for control, conversion and utilization of CO2 for sustainable development involving energy, catalysis, adsorption and chemical processing." Catalysis today 115.1-4 (2006): 2-32.

United States Environmental Protection Agency, Executive Summary of the Inventory of U.S. Greenhouse Gas Emissions and Sinks: 1990-2013, Apr. 15, 2015.

Usubharatana, P., et al. "Photocatalytic process for CO2 emission reduction from industrial flue gas streams." Industrial & engineering chemistry research 45.8 (2006): 2558-2568.

Venkov, Tz. et al. "FTIR study of CO interaction with Cu/TiO2." Catalysis Communications 4.4 (2003): 209-213.

Wanbayor, R. et al. "Adsorption of di-, tri-and polyatomic gases on the anatase TiO2 (0 0 1) and (1 0 1) surfaces and their adsorption abilities." Journal of Molecular Structure: THEOCHEM 952.1-3 (2010): 103-108.

\* cited by examiner

SYSTEMS AND METHODS FOR SIMULTANEOUS CONTROL OF CARBON DIOXIDE AND NITRIC OXIDE AND GENERATION OF NITROUS OXIDE

CROSS-REFERENCE TO RELATED APPLICATIONS

This application represents the national stage entry of PCT International Application No. PCT/US2017/030499 filed May 2, 2017, which claims priority to U.S. patent Application No. 62/330,533 filed May 2, 2016, both of which are hereby incorporated by reference as if set forth in their entirety herein.

STATEMENT REGARDING FEDERALLY SPONSORED RESEARCH

This invention was made with government support under 1067340 awarded by the National Science Foundation. The government has certain rights to the invention.

BACKGROUND OF THE INVENTION

1. Field of the Invention

This invention relates generally to photoreduction and, more specifically, to systems and methods for simultaneous photoreduction control of carbon dioxide and nitric oxide and generation of nitrous oxide.

2. Description of the Related Art

Nitric oxide (NO) and carbon dioxide ($CO_2$) are typically generated in combustion systems. Numerous techniques have been developed to control NO, most of which employ either a modification of the combustion process or the addition of chemicals (e.g., an ammonia containing liquid such as urea). $CO_2$ is an important greenhouse gas that is currently a subject of concern due to the US Environmental Protection Agency's new Carbon Rule that limits carbon emissions from stationary combustion sources such as power plants. Thus, a need exists to replace current energy intensive NOx control techniques for combustion sources (e.g., vehicles, electricity generating utilities, etc.) and simultaneously control carbon dioxide levels.

SUMMARY OF THE INVENTION

The present invention provides systems and methods for simultaneous control of carbon dioxide and nitric oxide and generation of nitrous oxide. In particular, the present invention provides systems and methods utilizing a titania-based photocatalyst to simultaneously control carbon dioxide and nitric oxide levels generated by combustion systems. Additionally, photoreduction of nitric oxide provided by the photocatalyst is used to generate nitrous oxide.

In one aspect, the present disclosure provides a photoreduction system for a fluid stream. The fluid stream includes at least carbon dioxide and nitric oxide therein. The photoreduction system includes a catalyst arranged such that the fluid stream flows over a surface region of the catalyst, and a light source configured to illuminate the surface region of the catalyst. When the light source illuminates the surface region of the catalyst, a concentration of the carbon dioxide and a concentration of the nitric oxide in the fluid stream are reduced as the fluid stream flows over the surface region. The fluid stream may be a post-combustion stream.

In another aspect, the photoreduction system generates nitrous oxide when the concentration of nitric oxide is reduced as the fluid stream flows over the surface region.

In one aspect, the catalyst of the photoreduction system comprises a metal oxide. The metal oxide may have a band gap energy between 2 and 5 eV, or between 2.5 and 4.5 eV, or between 3 and 3.5 eV. In another aspect, the metal oxide comprises a dopant. In one aspect, the metal oxide comprises titanium dioxide. In one aspect, the titanium dioxide comprises a phase of anatase, brookite, rutile, and mixtures thereof. In some aspects, the phase of the titanium dioxide comprises a mixture of anatase and rutile. In other aspects, the dopant is a metal. In one aspect, the metal is selected from copper, platinum, silver, and mixtures thereof. In another aspect, the dopant is a non-metal. The non-metal may be iodine.

In another aspect, the catalyst can be copper modified titanium dioxide. The copper modified titanium dioxide is formed from reaction of a copper-containing compound and titanium dioxide particles having a mean diameter in a range of 10 to 50 nanometers. The copper modified titanium dioxide can have a copper content in a range of 0.01 to 5 wt. %, or in the range of 0.1 to 1 wt. %, or in the range of 0.2 to 0.8 wt. %.

In one aspect, the light source is configured to emit ultraviolet radiation. In some aspects, the catalyst consists essentially of copper modified titanium dioxide. In some aspects, the conversion of nitric oxide in the fluid stream is greater than 50%. In other aspects, the yield of nitrous oxide in the fluid stream is greater than 4%. In another aspect, the fluid stream includes flue gas.

In another aspect, the present disclosure provides a method for simultaneously controlling a carbon dioxide concentration and a nitric oxide concentration and generating nitrous oxide in a fluid stream. The method includes arranging a catalyst in the fluid stream such that the fluid stream flows over a surface region of the catalyst, and illuminating the surface region of the catalyst as the fluid stream flows over the surface region. The fluid stream may be a post-combustion stream.

In one aspect, the method includes a catalyst that comprises titanium dioxide. In another aspect, the catalyst comprises a material selected from the group consisting of anatase titanium dioxide, brookite titanium dioxide, rutile titanium dioxide, and mixtures thereof. In one aspect, the catalyst comprises a mixture of anatase titanium dioxide and rutile titanium dioxide. In another aspect, the catalyst comprises a material selected from the group consisting of copper modified titanium dioxide, iodine modified titanium dioxide, platinum modified titanium dioxide, silver modified titanium dioxide, and mixtures thereof. In one aspect, the catalyst comprises copper modified titanium dioxide.

In another aspect, the copper modified titanium dioxide is formed from reaction of a copper-containing compound and titanium dioxide particles having a mean diameter in a range of 10 to 50 nanometers, or in the range of 10 to 30 nanometers.

In one aspect, the method also includes copper modified titanium dioxide that has a copper content in a range of 0.01 to 5 wt. %, or in the range of 0.1 to 1 wt. %, or in the range of 0.2 to 0.8 wt. %. In another aspect, the method also includes illuminating the surface region of the catalyst which comprises emitting ultraviolet radiation from a light source towards the surface region of the catalyst.

In another aspect, the present disclosure provides a photocatalytic reaction system. The photocatalytic reaction system comprises a photocatalytic reactor having an interior space in fluid communication with an inlet and an outlet. The photocatalytic reactor also includes a light source to irradiate at least a portion of a catalyst in the interior space. The photocatalytic reaction system further includes a fluid separation unit in fluid communication with the outlet of the photocatalytic reactor. The fluid separation unit is configured to separate at least one product of a plurality of products received from the photocatalytic reactor. The photocatalytic reaction system further includes an analyzer in fluid communication with the fluid separation unit for receiving the plurality of products, the analyzer comprising a detector, a second light source, and a controller in electrical communication with the detector and a second light source. The controller executes a program stored in the controller to irradiate at least two products of the plurality of products using the second light source, generate an absorbance spectrum ($A_{meas}$) of the at least two products from electrical signals received from the detector, wherein the absorbance spectrum includes a co-eluting peak, and de-convolute the co-eluting peak to compute a concentration of one or more of the at least two products.

In one aspect, the analyzer includes a vacuum ultraviolet detector. In another aspect, the de-convolution of the co-eluting peak includes computing a calculated absorbance spectrum ($A_{calc}$) at one or more wavelengths according to:

$$A_{calc} = k(\sigma_1 N_1 + \sigma_2 N_2 + \ldots + \sigma_n N_n);$$

wherein $\sigma_n$ are cross section spectra (cm$^2$/molecule), and $N_n$ is total number of molecules for the one or more of the at least two products.

In one aspect, the de-convolution of the co-eluting peak includes computing a reference spectral absorbance (A) at one or more wavelengths according to:

$$A = (f_1 A_{1,ref} + f_2 A_{2,ref} + \ldots + f_n A_{n,ref});$$

wherein $f_n$ is a fitting parameter to be optimized, and $A_{n,ref}$ is the absorbance from an individual reference spectrum for the one or more of the at least two products.

In another aspect, the de-convolution of the co-eluting peak includes linear optimization by using a scaling parameter to match the absorbance spectrum ($A_{meas}$) to the reference spectral dictionary (A) or the calculated absorbance spectrum ($A_{calc}$). In one aspect, the scaling parameter is selected from the group consisting of $f_n$ and $N_n$. In another aspect, the de-convolution of the co-eluting peak includes generating individual absorbance spectrum for each of the at least two products.

In one aspect, the individual absorbance peaks are integrated to calculate the concentration of each of the at least two products. In another aspect, the one or more wavelengths are between 120 and 250 nm. In one aspect, the fluid separation unit includes a gas chromatography column. In another aspect, a transfer line that is heated to a first temperature is configured to place the fluid separation unit in fluid communication with the analyzer. In one aspect, the first temperature is between 250° C. to 350° C. In another aspect, the transfer line is configured with an inert gas inlet at a first pressure. In one aspect, the first pressure is between 0.2 to 5 psi.

In another aspect, the present disclosure provides a method for determining the concentration of at least two products of a plurality of products from a photocatalytic reaction system. The method includes acquiring an absorbance spectrum ($A_{meas}$) of at least two products of a plurality of products using an analyzer where the absorbance spectrum including a co-eluting peak, de-convoluting the co-eluting peak by generating an individual absorbance spectrum for the at least two products, and computing a concentration for one or more of the at least two products based on the individual absorbance spectrums.

In one aspect, the analyzer in the method includes a vacuum ultraviolet detector. In another aspect, step (b) further includes computing a calculated absorbance spectrum ($A_{calc}$) at one or more wavelengths according to:

$$A_{calc} = k(\sigma_1 N_1 + \sigma_2 N_2 + \ldots + \sigma_n N_n);$$

wherein $\sigma_n$ are cross section spectra (cm$^2$/molecule), and $N_n$ is total number of molecules for the one or more of the at least two products. In one aspect, step (b) further includes computing a reference spectral absorbance (A) at one or more wavelengths according to:

$$A = (f_1 A_{1,ref} + f_2 A_{2,ref} + \ldots + f_n A_{n,ref});$$

wherein $f_n$ is a fitting parameter to be optimized, and $A_{n,ref}$ is the absorbance from an individual reference spectrum for the one or more of the at least two products.

In one aspect, step (b) further includes linear optimization by using a scaling parameter to match the absorbance spectrum ($A_{meas}$) to the reference spectral dictionary (A) or the calculated absorbance spectrum ($A_{calc}$). In another aspect, the scaling parameter is selected from the group consisting of $f_n$ and $N_n$.

In another aspect, step (c) further includes integrating the individual absorbance spectrums to calculate the concentration for the one or more of the at least two products.

In another aspect, the present disclosure provides a method for analyzing a sample derived from a photocatalytic reaction. The method steps include using gas chromatography coupled with vacuum ultraviolet detection for analyzing gaseous species in the sample.

In another aspect, the present disclosure provides a method for analyzing a sample derived from a photocatalytic reaction. The method steps include using gas chromatography coupled with thermal conductivity detection for analyzing gaseous species in the sample.

These and other features, aspects, and advantages of the present invention will become better understood upon consideration of the following detailed description, drawings and appended claims.

DETAILED DESCRIPTION OF THE INVENTION

The conversion of $CO_2$ to value-added products (i.e., fuels, chemical feedstocks) can be implemented to enhance current post-combustion carbon capture and sequestration (CCS) technologies. Typically composed of approximately 10-12% $CO_2$, by volume, flue gas from large-point stationary sources, such as coal fired power plants, is considered a highly practical source for $CO_2$ conversion technologies. Various approaches have been developed to convert $CO_2$ to value-added products including: electrochemical, photochemical, photo-electrochemical, and photocatalytic conversion. Among these approaches, photocatalytic reduction of $CO_2$ is particularly attractive due to sunlight being the only energy input.

One such approach for photocatalytic reduction of $CO_2$ utilize titania ($TiO_2$)-based materials as a catalyst for UV-driven $CO_2$ conversion in the presence of water. The band gap energies of its most widely studies polymorphs-anatase (3.24 eV) and rutile (3.03 eV)-makes $TiO_2$ an ideal choice among other semiconductor materials.

In regard to determining the applicability of a $CO_2$ photoreduction technology to current post-combustion CCS technologies, it is important to consider various factors that may influence its performance. For example, post-combustion streams generally contain impurities (e.g., oxides of nitrogen $NO_x$, and oxides of sulfur $SO_x$) that may impact the $CO_2$ photoreduction process. Typically, nitric oxide (NO) accounts for 90-95% of the $NO_x$ contained in flue gas. In a typical post-combustion stream, NO concentrations can range between 500 and 1000 parts per million (ppm) by volume.

As will be described, the present disclosure provides an approach that can control a $CO_2$ concentration, by photoreduction, in the presence of impurities in a post-combustion stream. Additionally, the approach described herein simultaneously enables the control of an NO concentration, by photoreduction, in post-combustion streams. The photoreduction of NO further enables the approach described herein to produce nitrous oxide, which is a commodity utilized by the semiconductor and medical industries.

Figure 1:
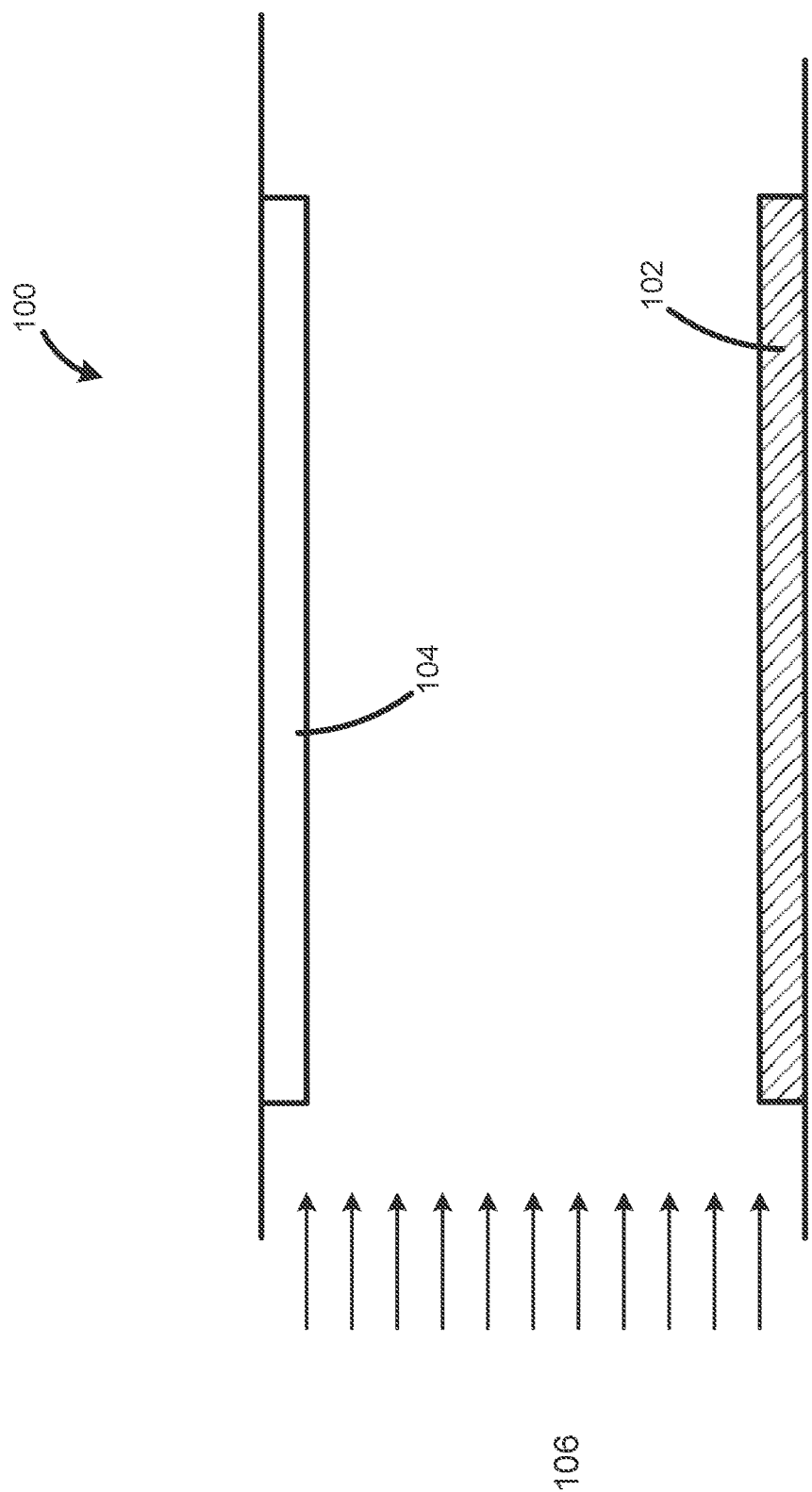
FIG. 1 shows a photoreduction system according to one aspect of the present disclosure.

FIG. 1 shows one non-limiting example of a photoreduction system 100 configured to control $CO_2$ and NO levels in an effluent stream 106. The photoreduction system 100 includes a catalyst 102 and a light source 104. In one embodiment, the catalyst 102 is arranged within the photoreduction system 100 such that the effluent stream 106 flows over at least one surface region of the catalyst 102. The catalyst 102 and the light source 104 are configured within the photoreduction system 100 such that the light source 104 can illuminate the surface region of the catalyst 102 to promote the conversion of carbon dioxide and nitric oxide in the effluent stream 106 to at least produce nitrous oxide and carbon monoxide.

It should be appreciated that the illustrated arrangement of the catalyst 102 is not meant to be limiting and, in other non-limiting examples, the catalyst 102 may be suspended within the photoreduction system 100 such that the effluent stream 106 flows over any number of surfaces of the catalyst 102. In some non-limiting examples, the catalyst 102 can be arranged within the photoreduction system 100 to form a fixed bed reactor, a fluidized bed reactor, or the like.

The light source 104 is arranged to irradiate the catalyst 102 with electromagnetic radiation. In one embodiment, the light source 104 is configured to irradiate the catalyst 102 to promote photoexcitation. Photoexcitation occurs when energy that is equal or greater than a band gap energy is delivered to the catalyst 102. In one non-limiting example, the light source 104 can be configured to emit ultraviolet radiation, in a wavelength range between approximately 300 nanometers (nm) and 400 nm, onto the catalyst 102. The light source 104 may be in the form of a lamp, a laser, one or more light emitting diodes, or any other device configured to emit electromagnetic radiation. The irradiation of the catalyst 102 provided by the light source 104 can facilitate the photoreduction of certain chemical species present in the effluent stream 106. In some embodiments, the light source 104 can be configured within the photoreduction system 100. In other embodiments, the light source 104 can be configured outside of the photoreduction system 100 and optical fibers, for example, may be used to facilitate the irradiation of the catalyst 102 with the light source 104.

In some embodiments, the catalyst 102 can comprise a metal oxide. In some non-limiting examples, the catalyst 102 comprises the metal oxide modified with a dopant. In some non-limiting examples, the dopant can include a metal. Suitable metals may include copper, platinum, silver, and mixtures thereof. In some embodiments, the dopant can include a non-metal. Suitable nonmetals may include iodine and the like. In another non-limiting example, the catalyst 102 may include a metal oxide that has a band gap energy that is between 2 and 5 eV, or between 2.5 and 4.5 eV, or between 3 and 3.5 eV.

In some embodiments, the effluent stream 106 can be any fluid stream that includes at least carbon dioxide and nitric oxide therein. In other embodiments, the effluent stream 106 could include any flue gas or post-combustion stream. In some non-limiting examples, the effluent stream 106 could include a post-combustion or flue gas stream from any of the following industries: gas, oil refining, pulp and paper industry, gas separation industries, waste management companies, or the like.

In some embodiments, a suitable catalyst 102 can include a metal oxide that comprises titanium dioxide. In other embodiments, the metal oxide can consist essentially of titanium dioxide. In other embodiments, the titanium dioxide includes a phase that comprises anatase titanium dioxide, brookite titanium dioxide, rutile titanium dioxide, and mixtures thereof. A brookite $TiO_2$, particularly one that has many oxygen vacancies, may result in more conversion of $CO_2$ to CO. In another non-limiting example, the catalyst 102 can be fabricated from a mixture of anatase titanium dioxide and rutile titanium dioxide. In another non-limiting example, the catalyst 102 can be fabricated from a material that comprises copper modified titanium dioxide, iodine modified titanium dioxide, platinum modified titanium dioxide, silver modified titanium dioxide, and mixtures thereof. In another non-limiting example, the catalyst 102 can be fabricated from P25 titanium dioxide ($TiO_2$). In another non-limiting example, the catalyst can be fabricated from copper modified $TiO_2$ (Cu—$TiO_2$).

In some embodiments, the copper modified titanium dioxide is formed from a reaction of a copper-containing compound and titanium dioxide particles. In some aspects, the titanium dioxide particles have a mean diameter in a range between 10 to 50 nanometer, or between 10 to 30 nanometers. In one non-limiting example, the reaction of the copper-containing compound includes incipient wetness following by a heating step such as drying or calcination. In some embodiments, the copper modified titanium dioxide has a copper content in a range of 0.01 to 5 wt. %, or between 0.1 to 1 wt. %, or between 0.2 to 0.8 wt. %.

In operation, the light source 104 is configured to illuminate the catalyst 102 as the effluent stream 106 flows over the catalyst 102. As the effluent stream 106 flows over the illuminated catalyst 102, carbon dioxide and/or nitric oxide present in the effluent stream 106 can be photocatalytically reduced, as will be described in detail below. Thus, the photoreduction system 100 enables the control of a carbon dioxide concentration and a nitric oxide concentration downstream of the catalyst 102. The photoreduction of the carbon dioxide and the nitric oxide in the effluent stream 106 can lead to the generation of carbon monoxide and nitrous oxide, respectively, as will be described in detail below. In some embodiments, the catalyst 102 enables a conversion of nitric oxide in the effluent stream 106 that is greater than 50%, and a yield of nitrous oxide in the fluid stream that is greater than 4%. One or more of these generated commodities may be harvested and supplied to other industries (e.g., semiconductor industry, medical industry).

Figure 2:
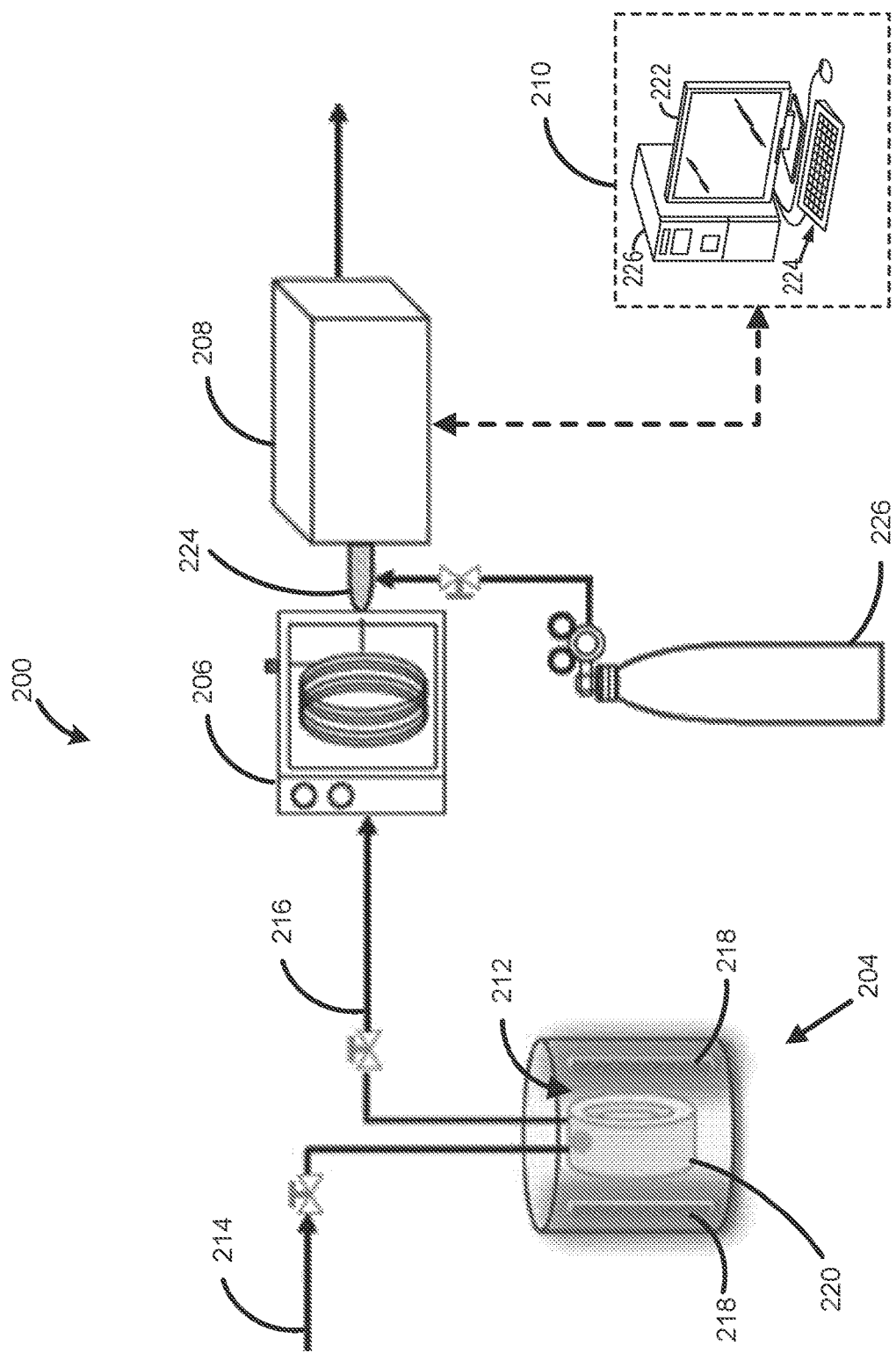
FIG. 2 shows a photocatalytic reaction system according to one aspect of the present disclosure.

FIG. 2 shows one non-limiting example of a photocatalytic reaction system 200 configured to control $CO_2$ and NO levels from a post-combustion fluid stream. The photocatalytic reaction system 200 includes a photocatalytic reactor 204 in fluid communication with a fluid separation unit 206 and an analyzer 208. The photocatalytic reaction system 200 further includes a controller 210 in electrical communication with the analyzer 208.

In one embodiment, the photocatalytic reactor 204 includes an interior space 212 in fluid communication with an inlet 214 and an outlet 216 fluid stream. The photocatalytic reactor 204 also includes a light source 218 configured to irradiate at least a portion of a catalyst 220 in the interior space 212. In some embodiments, the fluid separation unit 206 is in fluid communication with the outlet 216 of the photocatalytic reactor 204 where it is configured to receive at least one product of a plurality of products from the photocatalytic reactor 204. In some embodiments, the separation unit includes a gas chromatography column.

In some embodiments, the analyzer 208 is in fluid communication with the fluid separation unit 206 and is configured to receive the plurality of products from the separation unit 206. In some embodiments, a transfer line is configured to place the separation unit 206 in fluid communication with the analyzer 208. In some aspects, the transfer line is heated to a first temperature. The first temperature can range between 25° and 350° C. In some embodiments, the transfer line also includes an inert gas inlet 224 that is in fluid communication with a pressurized tank 226. In some aspects, the pressurized tank 226 includes nitrogen or any suitable inert gas. In some embodiments, the pressurized tank 226 is configured to regulate the transfer line to a first pressure. In some aspects, the first pressure is between 0.2 to 5 psi. In other aspects, the first pressure is between 0.4 to 0.8 psi.

In some embodiments, the analyzer 208 includes a second light source, a sample tube configured to transport the plurality of products, and a detector. In one non-limiting example, the second light source is configured to irradiate the sample tube at one or more wavelengths, and a detector is configured to receive the transmitted light that passes through the sample tube. In some embodiments, the controller 210 is in electrical communication with the detector and the second light source. In one non-limiting example, the controller 210 includes a display 222, one or more input devices 224 (i.e., a keyboard, a mouse, etc.), and a processor 226. The processor 226 may include a commercially available programmable machine running on a commercially available operating system. The controller 210 provides an operator interface that facilitates entering in operating wavelengths for the second light source, and allows data received from the detector to be processed.

As mentioned above, one aspect of the present disclosure is to provide a system and method for producing nitrous oxide and carbon monoxide from a post-combustion stream using a photoreduction catalyst. As will be described below, another aspect of the present disclosure is to provide a system and method for accurately analyzing gas phase products derived from photoreduction reactions. One of the challenges associated with such a system is that many of the products from photoreduction reactions include chemically similar products (i.e. polarity, molecular weight, etc.), which has made it difficult to accurately quantitate the amount of all the products exiting the photoreactor due to co-elution of the products after the separation unit. As will be used herein, a co-eluting peak or co-elution may refer to an absorbance spectrum that contains one or more product in a single absorbance peak.

Figure 3:
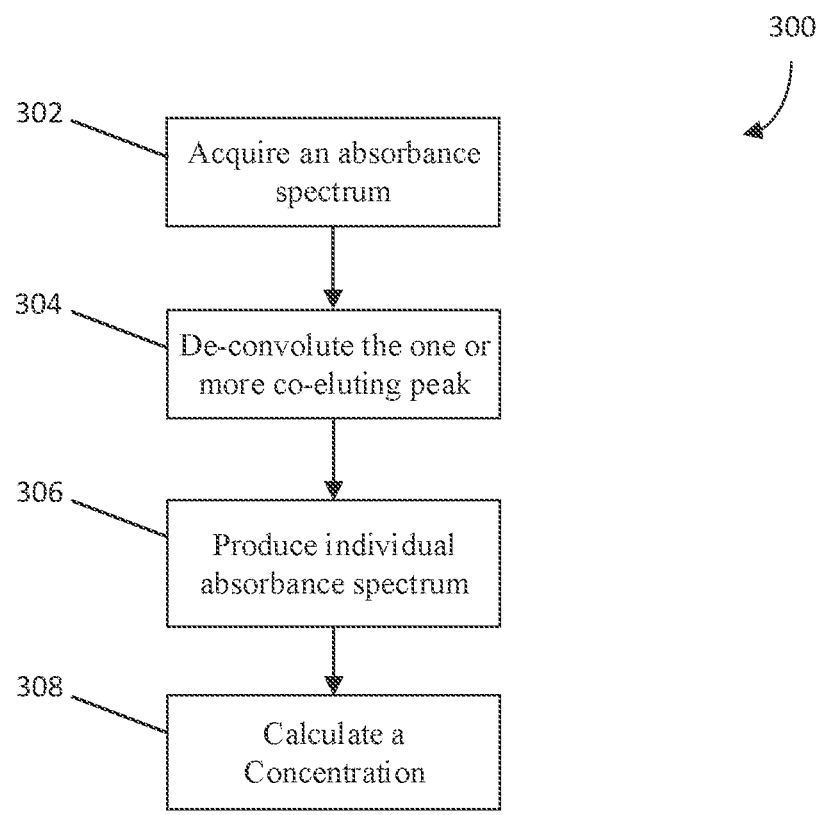
FIG. 3 shows a method of de-convoluting a co-eluted absorbance spectrum according to one aspect of the present disclosure.

Referring to FIG. 3, another aspect of the present disclosure is to provide a method 300 for de-convoluting absorbance spectrum that include one or more co-eluting peaks to determine the individual concentrations of photocatalytic reaction products using the photocatalytic reaction system 200.

In operation, the controller 210 in the photocatalytic reaction system 200 executes a program stored to acquire an absorbance spectrum at step 302. In some embodiments, acquiring an absorbance spectrum includes irradiating at least two products of the plurality of products using the second light source in the analyzer 208. In some aspects, irradiating the at least two products occurs at one or more wavelengths between 120 and 250 nm. In some embodiments, acquiring an absorbance spectrum also includes generating an absorbance spectrum ($A_{meas}$) of the at least two products from electrical signals received from the detector, the absorbance spectrum including the co-eluting peak.

Next, the controller 210 de-convolutes the one or more co-eluting peaks at step 304. In some embodiments, step 304 includes de-convoluting the co-eluting peak and subsequently computing a concentration of the one or more of the at least two products. In some embodiments, the de-convolution step can include computing a calculated absorbance spectrum ($A_{calc}$) at one or more wavelengths according to:

$$A_{calc} = k(\sigma_1 N_1 + \sigma_2 N_2 + \ldots + \sigma_n N_n); \quad (1)$$

wherein $\sigma_n$ are cross section spectra (cm$^2$/molecule), and $N_n$ is total number of molecules for the one or more of the at least two products. Alternatively, the deconvolution step can also include computing a reference spectral absorbance (A) at one or more wavelengths according to:

$$A = (f_1 A_{1,ref} + f_2 A_{2,ref} + \ldots + f_n A_{n,ref}); \quad (2)$$

wherein $f_n$ is a fitting parameter to be optimized, and $A_{n,ref}$ is the absorbance from an individual reference spectrum for the one or more of the at least two products. In some embodiments, the individual reference spectrum for the one or more of the at least two products are stored in a library in the controller 210. In some embodiments, the individual reference spectrum include oxygen, carbon monoxide, nitric oxide, methane, carbon dioxide, nitrous oxide, and water. Next, the reference spectral dictionary (A) or the calculated absorbance spectrum ($A_{calc}$) can be matched to the absorbance spectrum ($A_{meas}$) by using linear optimization and adjusting a scaling parameter. In some embodiments, the scaling parameter can include $f_n$ or $N_n$. Once the scaling parameter has been optimally adjusted, equations (1) and (2) can be used to generate individual absorbance spectrum for the at least two products in the co-eluting peak at step 306. Next, the individual absorbance spectrum for the at least two products can be integrated to calculate the concentration of each of the at least two products 308.

EXAMPLES

The following examples set forth, in detail, ways in which the photoreduction system 100 may be used or implemented, and will enable one of skill in the art to more readily understand the principles thereof. The following examples are presented by way of illustration and are not meant to be limiting in any way.

The photocatalytic reduction of carbon dioxide ($CO_2$) in the presence of water ($H_2O$) vapor and nitric oxide (NO) over a titanium dioxide and a copper-modified $Cu$—$TiO_2$ photocatalyst was studied in a custom-designed cylindrical photoreactor system operating at room temperature. A gas chromatograph (GC) with a vacuum ultraviolet (VUV) detector was utilized to analyze the formation of gas phase products derived from $CO_2$ photoreduction over these $TiO_2$ materials in the presence and absence of NO. Experimental results indicate that a $CO_2$/$H_2O$ system assists in the favorable formation of carbon monoxide (CO) over both $TiO_2$ and $Cu$—$TiO_2$. After 2 hours of UV illumination, the $Cu$—$TiO_2$ catalyst delivered a CO production amount of 3.51 μmol/g-catalyst. The photoreduction of $CO_2$ in the presence of $H_2O$ and NO over the $Cu$—$TiO_2$ catalyst resulted in a decrease in CO formation (1.80 μmol/g-catalyst at two hours) using the same mass of catalyst, but also resulted in the formation of nitrous oxide ($N_2O$). In systems with NO, conversions of 53.3% and 72.5% of the starting NO concentrations of up to 1000 ppm (a level that is typical of combustion systems) were realized over the $Cu$—$TiO_2$ and $TiO_2$ catalysts, respectively. These photocatalytic systems resulted in nitrous oxide formation at levels of 29% N and 12.1% N, respectively. The balance of the converted nitrogen is likely $N_2$ since no other features were detected in the GC-VUV spectra, and nitrogen is the only specie that cannot be detected by the VUV detector due to its very low absorbance cross section as compared to other species. The variations in the amounts of nitrous oxide formed suggest that tuning of the catalyst can occur to generate the desired nitrous oxide production. The experiments were conducted at ~298 K and 1 atm, utilizing up to approximately 820 ppm of NO and 3-4% v of $CO_2$, with 70% relative humidity. Ultraviolet lamps were used to initiate the chemistry.

$Cu$—$TiO_2$ Catalyst Preparation

Copper chloride dehydrate ($CuCl_2 \cdot 2H_2O$, >99.0%, Sigma-Aldrich) and Aeroxide® $TiO_2$ P25 (≥99.5%, Sigma-Aldrich) were used as the precursor and starting $TiO_2$ material, respectively. Aeroxide® $TiO_2$ P25 is a fine white powder with hydrophilic character caused by hydroxyl groups on the surface. It comprises aggregated primary particles. The aggregates are several hundred nanometers in size and the primary particles have a mean diameter of approx. 21 nm. Particle size and density of ca. 4 g/cm$^3$ lead to a specific surface of approx. 50 m$^2$/g.

A one-step process was used to prepare Cu-modified $TiO_2$ ($Cu$—$TiO_2$). The incorporation of copper into the commercial P25 $TiO_2$ was achieved through an incipient wet impregnation process. Accordingly, 2 grams (g) of $TiO_2$ nanoparticles were dispersed in 100 mL of NaOH aqueous solution. Then, 25 milliliters (mL) of $CuCl_2$ solution was added drop-wise under magnetic stirring. After further stirring, the precipitates were washed and centrifuged with Nanopure water (18.1 MΩ) until a pH of 7 was obtained. The resulting material was dried at 80° C. overnight. The nominal copper content was kept at 0.5 wt. % because this amount of copper can correspond to an optimum photocatalytic activity level.

GC-VUV Instrumentation and Gas Standards

Recent studies have introduced the use of gas chromatography coupled with vacuum ultraviolet (GC-VUV) detection as a means for analyzing gaseous species. This technique provides universal detection of species through rapid light absorption measurements in the 115-240 nm wavelength region. All chemical species can absorb in this wavelength region, and possess unique and distinctive absorbance features that may be used for identification and quantification. In a typical GC-VUV system, eluting analytes from the GC's column pass through a heated transfer line into the VUV system's flow cell (10 cm long×1 mm inside diameter) together with make-up gas ($N_2$). The source module houses a deuterium lamp, which redirects and focuses light through the flow cell. The detector module houses a parabolic mirror to redirect light onto a diffraction grating which diffracts the light onto a back-thinned charged coupled device (CCD).

In this disclosure, a Bruker 456-GC (Scion Instruments, Inc., Fremont, California) was coupled to a VGA-100 VUV detector (VUV Analytics, Inc., Austin, Texas) and used to collect data from injected gas samples. The data collection rate for the VUV was set at 9 Hz. The transfer line and VUV flow cell temperatures were set at 300° C. and 275° C., respectively, and the make-up gas (nitrogen) was set to 0.61 psi. The GC column used was a fixed fused silica Q-plot column (30 mm×0.53 mm and average thickness of 20 μm, Bruker) and it was operated at a constant column flow rate of 8.3 mL/min with helium as a carrier gas. The GC temperature program started at 40° C., held for 4 minutes, and then increased to 120° C. at a rate of 20° C./min. The final temperature was held for 2 minutes. All injections were performed manually. This work represents the first ever study wherein a GC-VUV system is utilized to analyze the stable products derived from a photocatalytic reaction.

A series of standards were prepared to identify species of interest, as well as to create calibration curves (concentration vs. peak area of analyte) for the quantification of products formed. Compressed $CO_2$ (99%, Air Liquide), $CH_4$ (99.97%, Praxair), CO (90.85%, Praxair), NO (1000 ppm balanced in helium, Praxair) and $N_2O$ (1 ppm balanced in $N_2$, Supelco, Sigma-Aldrich) were used as standards for positive identification and calibration.

Reactor Experiments: Photoreduction of $CO_2$ in the Presence of Water and NO

In the photocatalytic reduction of $CO_2$, a fixed amount of catalytic material (~0.3 g) was uniformly dispersed onto a glass fiber filter (Whatman, QMA, 4.7 cm) and placed in a 200 mL cylindrical photoreactor containing stainless steel (SS) walls and a quartz window. Quartz wool wetted with Nanopure water (18.1 MΩ) was also placed in the reactor to maintain moisture within the system. Flowing compressed $CO_2$ with $H_2O$ at a relative humidity of 70% and, when applicable, NO into the reactor generated a mixture of reactants that were balanced in helium or nitrogen. After ~25 minutes of flow, the reactor was subsequently turned to batch mode. The initial concentrations of $CO_2$ and NO ranged between 3.0-4.0% by volume and 610-819 ppm by volume (0.0610-0.0819% by volume), respectively.

Figure 4:
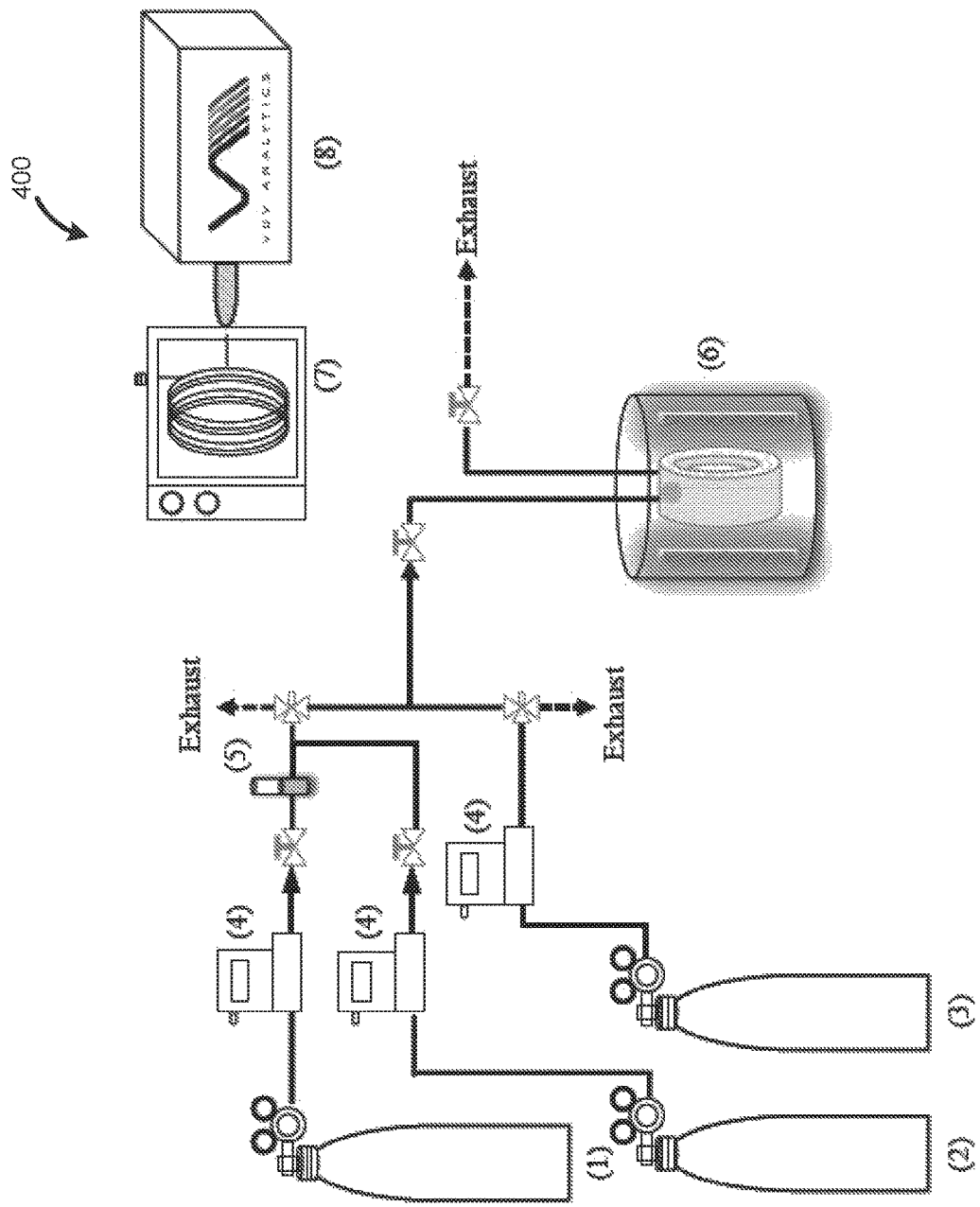
FIG. 4 shows an experimental setup to test the photoreduction system of FIG. 1.

FIG. 4 shows a schematic of an experimental setup used for testing a photocatalytic reaction system 400. The photocatalytic reaction system 400 includes: (1) 99.99% $CO_2$ cylinder, (2) 1000 ppm NO cylinder, (3) UHP $N_2$ cylinder, (4) Mass flow controller, (5) Impinger, (6) Photoreactor, (7) Bruker GC, and (8) vacuum ultraviolet detector. A photochemical reactor (Srinivasan-Griffin Rayonet) equipped with uniform UV irradiation (supplied by Rayonet, RPR-3500A UVA 315-400 nm bulbs) and proper ventilation was used to illuminate the SS-quartz reactor containing the catalytic material. During the illumination period of 2 hours, 200 µL of gas was taken at fixed intervals from the SS reactor using a gastight syringe (VICI Precision Sampling, A-2 RN, 500 µL). Gaseous samples were manually injected into the GCVUV.

A series of background tests were conducted to support the conclusion that any carbon- or nitrogen-containing species in the gaseous samples measured by the GC-VUV originated from $CO_2$ or NO reaction in the presence of the catalytic surface, $H_2O$ and/or NO. Initial background experiments consisted of illuminating a mixture of reactants ($CO_2$, $H_2O$ and/or NO) in the SS reactor in the absence of catalytic material. Ultra-high pure nitrogen and $H_2O$ vapor were used as the reaction gases, and the system was tested with catalytic material loaded in the reactor. Furthermore, the interaction of NO with the catalysts was studied at room temperature to determine the yield of nitrous oxide ($N_2O$) in the absence of $CO_2$ and $H_2O$.

GC-VUV Analysis of Gas Standards

Figure 5:
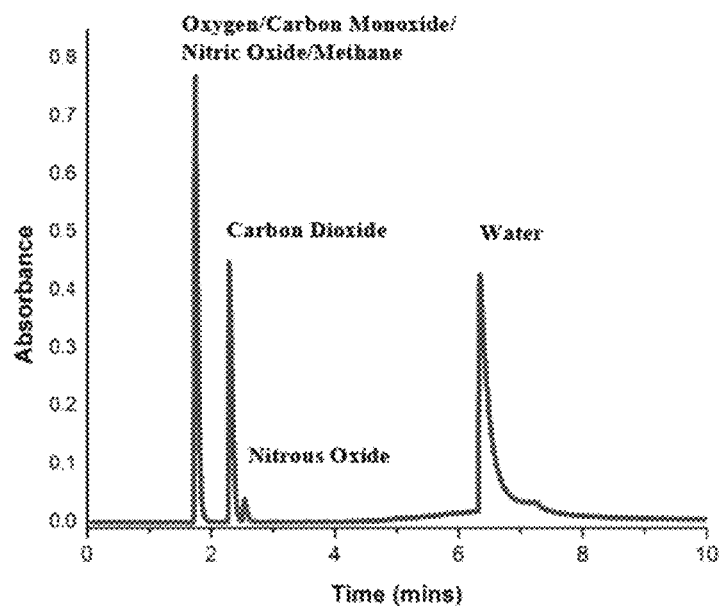
FIG. 5 is a graph illustrating a full GC-VUV chromatogram of species according to one aspect of the present disclosure.
Figure 6:
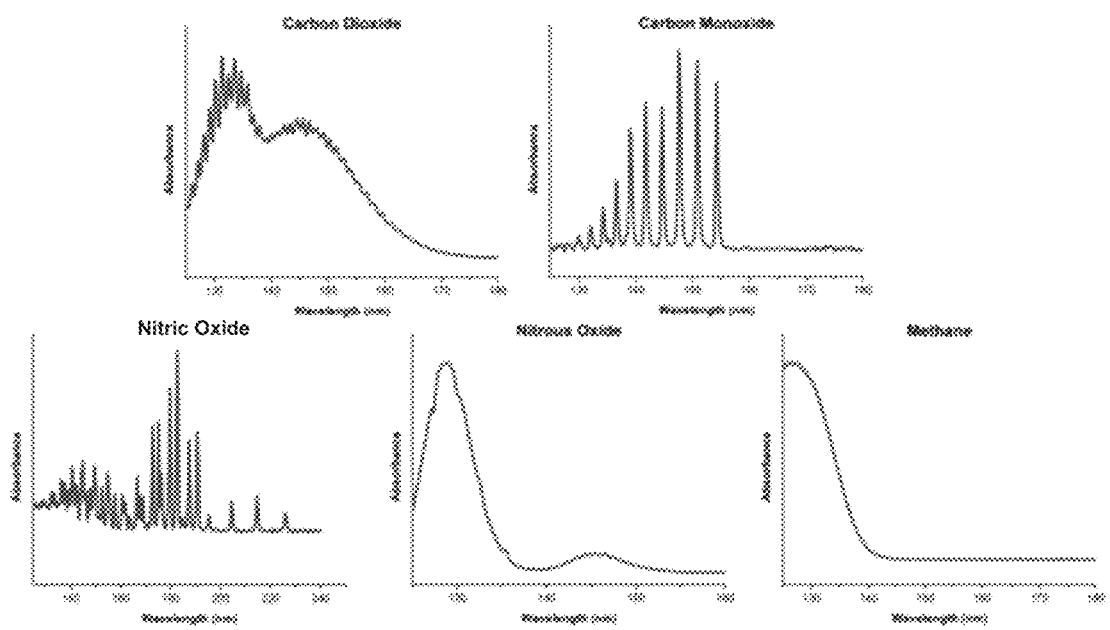
FIG. 6 shows graphs of absorbance spectra of various analytes.

FIG. 5 shows the separation and detection of components of interest using the plot-Q column on the Bruker 456-GC coupled with a VUV detector. The peaks displayed in FIG. 5 were identified based on both the injection of standard samples and, when available, matched with standards in the VUV spectral library. The VUV spectral features of each respective compound are shown in FIG. 6. It was observed that all analyzed compounds exhibited significant absorptivity in the 125-160 nm wavelength region. As a result of the type of column and temperature program utilized in this study, oxygen, carbon monoxide, nitric oxide, and methane were all found to co-elute with one another to some degree. In light of this, de-convolution of the first peak shown in FIG. 3 was necessary in order to quantify the respective peak areas of each compound. De-convolution of co-eluting peaks was accomplished using the VUV Model & Analyze software, v4.7 (VUV Analytics Inc., Cedar Park Texas). The model absorbance spectrum where n analytes are simultaneously present in the flow cell, as is the case for chromatographic co-elution, is given by:

$$A_j = \frac{1}{\ln(10)} \frac{d}{v} \sum_{i=1}^{n} \sigma_{ij} N_i = \frac{1}{\ln(10)} \frac{d}{V} (\sigma_{1j}N_1 + \sigma_{2j}N_2 + \ldots + \sigma_{nj}N_n). \quad (3)$$

In equation 3, d is the flow cell length and V is the flow cell length, both constants. There is one equation like this at each wavelength value j ranging from 125-240 nm. Removing the subscript j, and absorbing all constants into a single value k, allows for generalization of the wavelength dependence of absorption:

$$A = k(\sigma_1 N_1 + \sigma_2 N_2 + \ldots + \sigma_n N_n) \quad (4)$$

where A is the calculated absorbance spectrum, to be compared with $A_{meas}$, the measured absorbance spectrum. The $\sigma_i$ are cross section spectra (in cm$^2$/molecule) for each of the components present in the co-eluting peak (stored in the VGA-100 spectral library database). For each analyte, there is one term consisting of the product of the number of analyte molecules, $N_i$ (a scalar) and the array of cross section values $\sigma_i$. The $N_i$ are parameters to be optimized, and the factors $k\sigma_i$ are the basis functions to be used in the linear optimization procedure (i.e., the fit procedure).

For this disclosure, a model was built from the analyte absorbance reference spectra, $A_{i, ref}$.

$$A = \sum_{i=1}^{n} f_i A_{i,ref} = (f_1 A_{1,ref} + f_2 A_{2,ref} + \ldots + f_n A_{n,ref}) \quad (5)$$

Here $f_i$ are the fit parameters to be optimized and $A_{i,ref}$ are the basis functions. The advantage of building the model this way is that the absolute cross section need not be known; only the VUV spectrum, which is directly proportional to the absolute cross section, is required. The advantage of invoking known cross sections is that they allow for the determination of the actual on-column mass of each analyte.

Regardless of whether equation 4 or 5 is used, both contain a set of known basis functions and scaling factors, which can be determined by linear optimization. The result of fitting the procedure is the set of optimal parameters $N_i$ (Eq. 4) or $f_i$ (Eq. 5). These optimal scaling parameters can be put back into Eq. 4 or Eq. 5, accordingly, to determine the calculated absorbance spectrum, which ideally differs from the measured spectrum only by the measurement noise. A caveat is that the reference spectra of the co-eluting analytes, i.e. $\sigma_i$ in Eq. 4 or $A_{i,ref}$ in Eq. 5, which are to be de-convolved must be known and distinct from one another. Typical product spectra are shown in FIG. 5, and are very distinct from each other, thus enabling de-convolution.

With analyte reference spectra, the optimized $f_i$ reflect the amount of the ith component relative to the ith reference spectrum represented in the measure absorbance. When the model is applied to a chromatographic peak comprised of co-eluting components, new curves representing the contribution of each of these analytes to the original peak are generated. The areas of these curves were used to quantify the analyte amounts in the photocatalytic reaction experiments described herein.

$CO_2/H_2O/NO$ Photocatalytic Experiments

The catalyst 102 comprised commercial P25 $TiO_2$ and the synthesized Cu—$TiO_2$ in the $CO_2$ photoreduction experiments. In the background study where the system was illuminated in the absence of catalytic material, the $CO_2$ and NO concentrations remained constant, and no products were observed. In the case in which the catalyst 102 was exposed to the reactants in the absence of UV illumination, no products were observed. Both studies demonstrated that $CO_2$ and NO conversion only commenced when the catalyst 102 was present together with the light source 104. In the system where $H_2O$ vapor and $N_2$ were the only reactants, the catalyst 102 under UV illumination from the light source 104 produced no carbon-containing species. This further demonstrated that any carbon or nitrogen containing products that were produced were derived from $CO_2$ and/or NO in the reaction gases.

Figure 7:
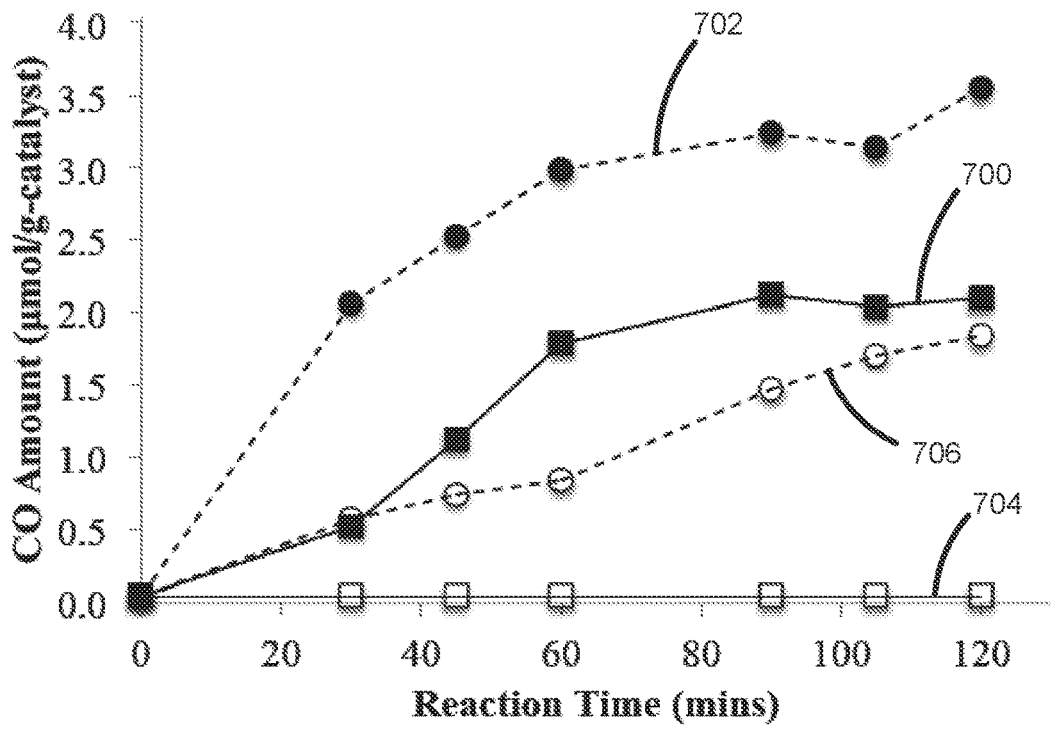
FIG. 7 is a graph illustrating CO formation over P25 $TiO_2$ and Cu—$TiO_2$ catalysts in the presence of $CO_2/H_2O$ and $CO_2/H_2O/NO$ as a function of reaction time.

In a system where $CO_2$ and $H_2O$ were the sole gaseous reactants, it was observed that illumination of the commercial P25 $TiO_2$ and Cu—$TiO_2$ surfaces resulted in a loss of gas-phase CO$_2$ and a corresponding increase in CO. In all conducted experiments, no CH$_4$ was detected, suggesting that the utilized catalysts have a higher selectivity for CO formation. In comparison to commercial P25 TiO$_2$, the Cu—TiO$_2$ photocatalyst demonstrated the best photocatalytic activity—where the highest CO production was 3.51 μmol/g-catalyst after 2 hours of illumination, as shown in FIG. 7. In particular, line 700 in FIG. 7 represents the CO formation over the commercial P25 TiO$_2$ photocatalyst in the presence of CO$_2$ and H$_2$O, and line 702 in FIG. 7 represents the CO formation over the Cu—TiO$_2$ photocatalyst in the presence of CO$_2$ and H$_2$O. Previous studies have found production rates of 0.17 μmol·g$^{-1}$·h$^{-1}$ and 0.35 μmol·g$^{-1}$·h$^{-1}$ over anatase and mixed-phase commercial P25 TiO$_2$, respectively.

It was established by preliminary experiments that, without UV illumination, the NO concentration in the photoreactor with a photocatalyst remains invariable. After UV light is introduced by the light source 104, the NO concentration decreases and N$_2$O subsequently forms. The N$_2$O was positively identified using its VUV spectrum. No other products of the photoreaction were observed. In the system where CO$_2$, H$_2$O, and NO were the reactants, it was observed that illumination of the commercial P25 TiO$_2$ surface resulted in a loss of gas-phase NO and a corresponding increase in N$_2$O. The system containing the Cu—TiO$_2$ catalyst showed favorable formation for both N$_2$O and CO products. Nonetheless, it was observed that the presence of NO in the system had a detrimental effect on the CO$_2$ photoreduction process-whereby the production of CO over Cu—TiO$_2$ significantly decreased to 1.80 μmol/g-catalyst, as shown in FIG. 7. In particular, line 704 in FIG. 7 represents the CO formation over the commercial TiO$_2$ photocatalyst in the presence of CO$_2$/H$_2$O/NO, and line 706 represents the CO formation over the Cu—TiO$_2$ photocatalyst in the presence of CO$_2$/H$_2$O/NO. Based on the kinetic theory of gases, it is expected that NO with a molecular weight of 30 would reach the surface faster than CO$_2$ with a molecular weight of 44, given that the speed of each is proportional to the (molecular mass)$^{-0.5}$. Thus, this significant decrease in CO production over both catalysts could stem from the favorable adsorption behavior of NO over titania-based materials and its ability to occupy important binding sites that are critical to reducing CO$_2$. However, the concentration of CO$_2$ in the feed is significantly higher than the concentration of NO. Therefore, a more plausible explanation is likely that the NO is interacting with the CO, thereby reducing the amount of CO that is desorbed from the surface and subsequently measured by the GC-VUV. This theory is explored subsequently in this disclosure.

Figure 8:
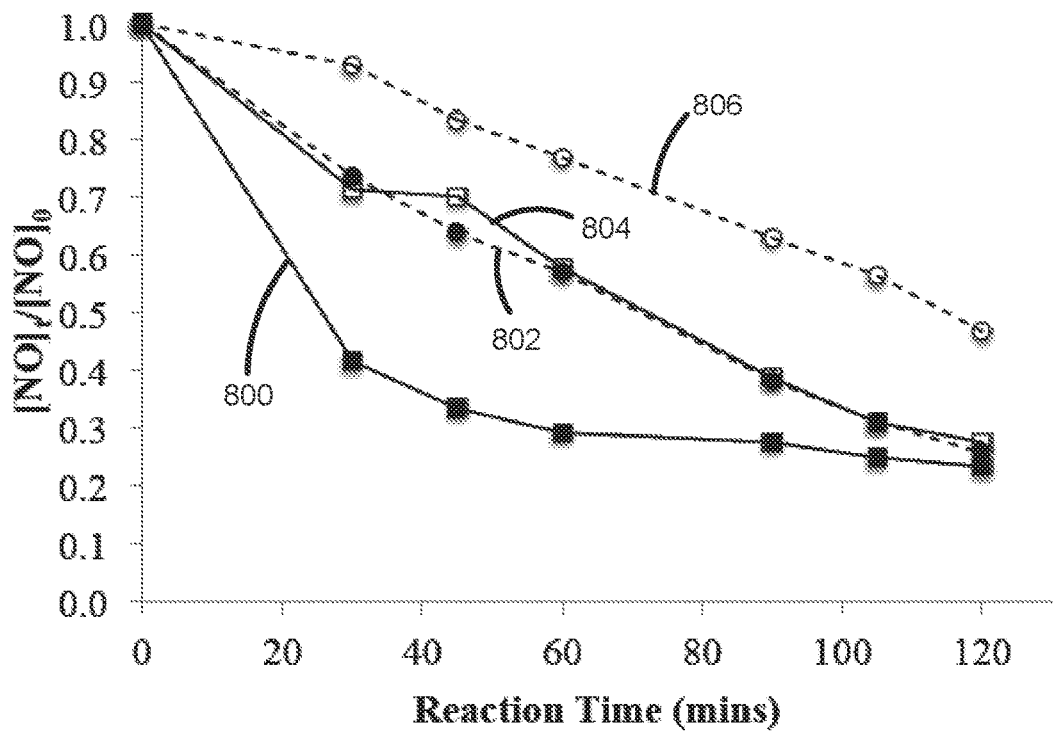
FIG. 8 is a graph illustrating NO degradation over P25 $TiO_2$ and Cu—$TiO_2$ catalysts in the presence of $CO_2/H_2O$ and $CO_2/H_2O/NO$ as a function of time.

FIG. 8 presents plots of the NO concentration as a function of the illumination time, by the light source 104, over the TiO$_2$ based photocatalysts. In particular, line 800 represents the NO concentration over the commercial P25 TiO$_2$ photocatalyst in the presence of NO, line 802 represents the NO concentration over the Cu—TiO$_2$ photocatalyst in the presence of NO, line 804 represents the NO concentration over the commercial P25 TiO$_2$ photocatalyst in the presence of CO$_2$/H$_2$O/NO, and line 806 represents the NO concentration over the Cu—TiO$_2$ photocatalyst in the presence of CO$_2$/H$_2$O/NO. The zero point corresponds to the beginning of illumination. The commercial P25 TiO$_2$ (line 800) catalyst is shown to exhibit more favorable NO degradation than Cu—TiO$_2$ (line 802) when CO$_2$ and H$_2$O are not present within the system. The lowest NO conversion was observed over the Cu—TiO$_2$ surface when CO$_2$ and H$_2$O are present within the system (line 806). It is proposed that this behavior may be due to CO$_2$ and NO competing for available electrons.

Figure 9:
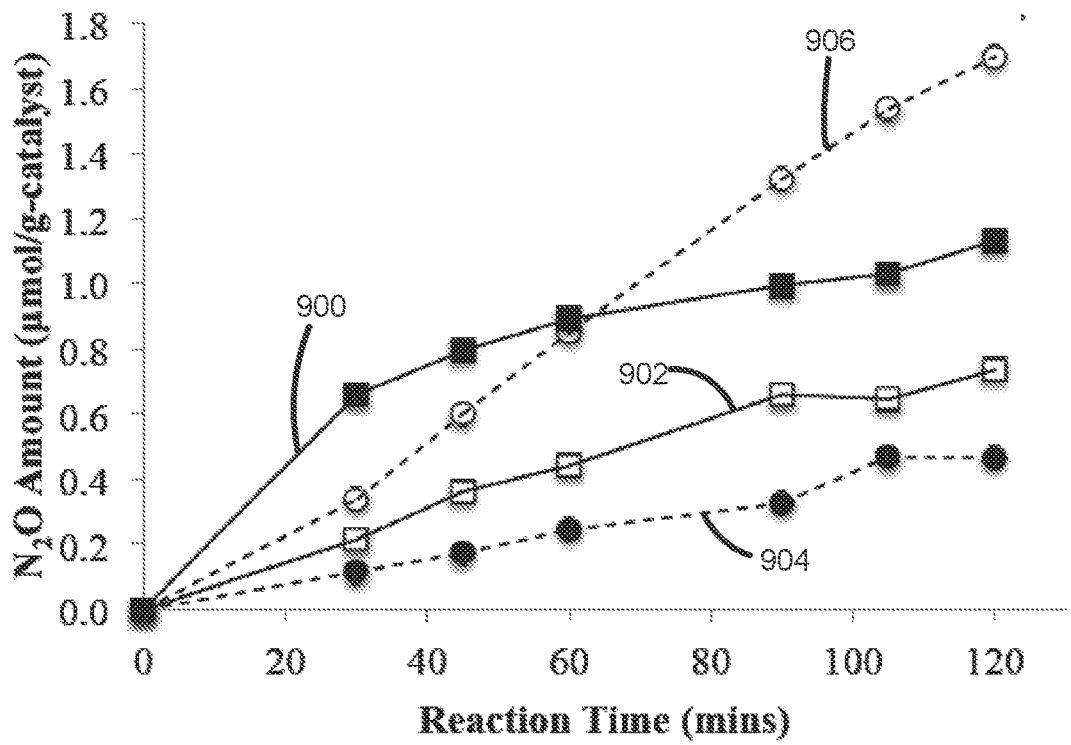
FIG. 9 is a graph illustrating $N_2O$ formation over P25 $TiO_2$ and Cu—$TiO_2$ catalysts in the presence of $CO_2/H_2O$ and $CO_2/H_2O/NO$ as a function of time.
Figure 10:
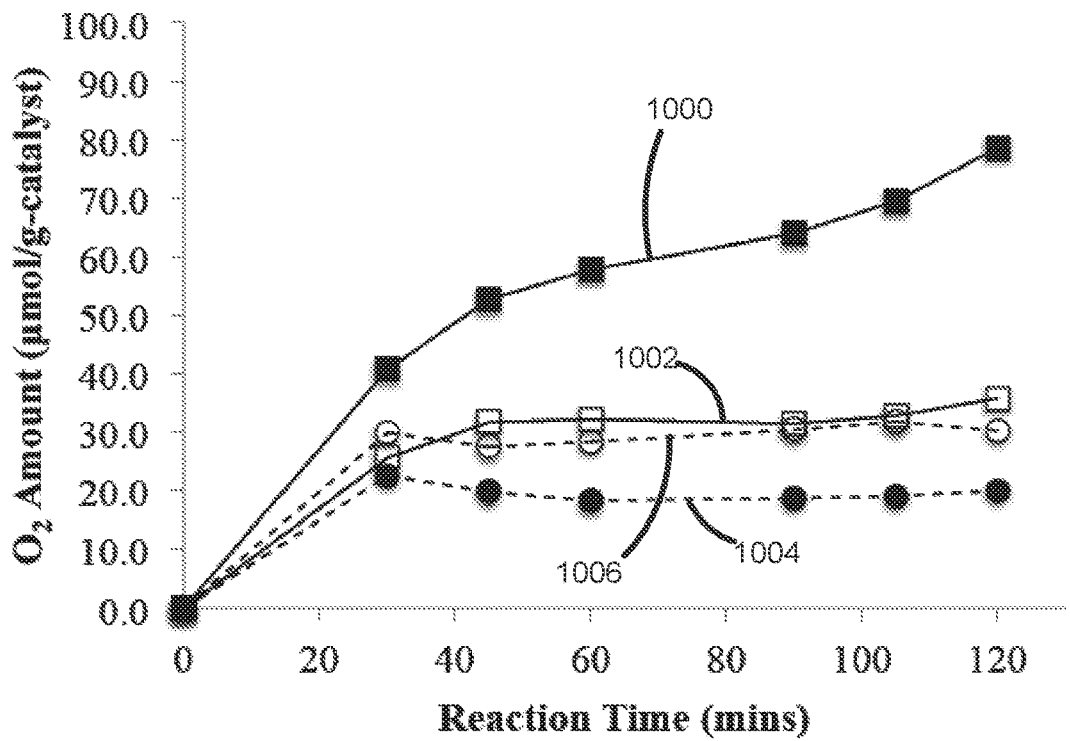
FIG. 10 is a graph illustrating $O_2$ formation over P25 $TiO_2$ and Cu—$TiO_2$ catalysts in the presence of $CO_2/H_2O$ and $CO_2/H_2O/NO$ as a function of time.

FIGS. 9 and 10 provide an account of the evolution of N$_2$O and O$_2$ from NO photoreduction over the commercial and copper modified P25 TiO$_2$. Specifically, FIG. 9 shows the N$_2$O evolution for the P25 TiO$_2$ photocatalyst in the presence of NO (line 900) and CO$_2$/H$_2$O/NO (line 902), and the N$_2$O evolution for the Cu—TiO$_2$ photocatalyst in the presence of NO (line 904) and CO$_2$/H$_2$O/NO (line 906). As shown in FIG. 9, favorable N$_2$O formation from CO$_2$ photoreduction in the presence of H$_2$O and NO over Cu—TiO$_2$ (line 906) can be achieved. FIG. 10 shows the O$_2$ evolution for the P25 TiO$_2$ photocatalyst in the presence of CO$_2$/H$_2$O (line 1000) and CO$_2$/H$_2$O/NO (line 1002), and the O$_2$ evolution for the Cu—TiO$_2$ photocatalyst in the presence of CO$_2$/H$_2$O (line 1004) and CO$_2$/H$_2$O/NO (line 1006).

FIGS. 9 and 10 clearly indicate that variables such as the reactant feed and type of catalyst have an effect on NO degradation to O$_2$ and N$_2$O. The reported O$_2$ evolution in each system reflects a cumulative production from a series of likely reactions such as H$_2$O splitting and NO reduction. Nitrous oxide was most prevalent in the system where CO$_2$ was reduced in the presence of H$_2$O and NO over the copper modified catalyst. This system exhibited a higher O$_2$ production than a system with just NO present. This trend may be due to the enhanced charge of the Cu—TiO$_2$ catalyst; which assists in the generation of more holes for H$_2$O splitting.

The calculated molar yield of N$_2$O and conversion of NO over the TiO$_2$ materials are reported in the table, below.

TABLE 1

Summary of NO molar conversion and N$_2$O yield (expressed as % N) over commercial P25 TiO$_2$ and Cu—TiO$_2$

| Inlet Conditions | NO Conversion (% N) | N$_2$O Yield (% N) |
|---|---|---|
| Commercial P25 TiO$_2$ + NO | 76.7 | 15.9 ± 3.9 |
| Commercial P25 TiO$_2$ + CO$_2$ + H$_2$O + NO | 72.5 | 12.1 ± 2.5 |
| Cu—TiO$_2$ + NO | 74.3 | 7.7 ± 1.8 |
| Cu—TiO$_2$ + CO$_2$ + H$_2$O + NO | 53.3 | 29.0 ± 3.2 |

The molar conversion percent of NO and molar yield percent of N$_2$O can be defined according to Equations 6 and 7, respectively:

$$\text{Conversion } (\% \ N) = \frac{n_{0,NO} - n_{f,NO}}{n_{0,NO}} \times 100 \tag{6}$$

$$N_2O \text{ Yield } (\% \ N) = \frac{2n_{f,N_2O}}{n_{0,NO} - n_{f,NO}} \times 100 \tag{7}$$

where $n_{0,i}$ is the number of moles of compound i at time zero, and $n_{f,i}$ is the number of moles of compound i at final illumination time.

The conversion of NO was found to range between 53.3% and 76.7%. It is of interest to note that the illumination of catalytic material in the presence of CO$_2$, H$_2$O, and NO over Cu—TiO$_2$ results in a higher N$_2$O yield than a system where just NO and Cu—TiO$_2$ are present. However, this trend (more than a factor of 4 increase in N$_2$O formation) was not observed over the commercial P25 TiO$_2$ surface, suggesting that the presence of Cu$^{2+}$ ions on the TiO$_2$ may have an effect on the surface chemistry. The CO molecule has demonstrated the ability to effectively probe $TiO_2$ surfaces with deposited metals. In most studies, it is observed that CO strongly adsorbs on Cu sites. In light of this, reaction 15 in Table 2, below, seems more plausible in explaining the enhanced formation of $N_2O$ over Cu—$TiO_2$. Instead, the NO reduction in the presence of $CO_2$ and $H_2O$ resulted in a 24 percent decrease in $N_2O$ formation over commercial P25 $TiO_2$.

As shown in Table 1, the yields of $N_2O$ (expressed as % N) from the reported photocatalytic systems do not fully account for the total amount of NO converted (% NO). The unaccounted-for converted nitrogen (N) for all four scenarios ranges between 24 and 66 percent and is hypothesized to be in the form of $N_2$. This hypothesis is supported by the fact that no additional products were detected by GC-VUV. The one material that is challenging to detect by VUV is $N_2$, given that $N_2$ has a very low absorbance cross section in the vacuum ultraviolet region. In addition, a published study of NO photocatalytic decomposition indicated that $N_2$ is a major product.

It is hypothesized that the high formation of CO over the Cu—$TiO_2$ surface (in comparison to P25 $TiO_2$) likely has a direct impact on the $N_2O$ yield. The results provided in FIGS. 7 and 9 lend support to this hypothesis. The change in CO production in going from the $CO_2/H_2O$ system to the $CO_2/H_2O/NO$ system is 1.71 μmol/g catalyst at 2 hours (i.e. 3.51 μmol/g-catalyst from the $CO_2/H_2O$ system minus 1.80 μmol/g-catalyst from the $CO_2/H_2O/NO$ system). This change in CO is directly comparable to the production of $N_2O$ that is seen in FIG. 9 at 2 hours, i.e., 1.70 μmol/g catalyst, suggesting a 1 to 1 mole ratio between CO consumption and $N_2O$ production over the Cu—$TiO_2$ catalyst. A slightly different result appears when comparing the CO and $N_2O$ levels in the $CO_2/H_2O$ and $CO_2/H_2O/NO$ systems over the P25 $TiO_2$ catalyst. As determined from FIGS. 7 and 9 for the P25 $TiO_2$ catalyst, the change in CO production in going from the $CO_2/H_2O$ to the $CO_2/H_2O/NO$ systems is approximately 2.1 μmol/g-catalyst (i.e. 2.1 μmol/g catalyst from the $CO_2/H_2O$ system minus 0 μmol/g-catalyst from the $CO_2/H_2O/NO$ system), while the $N_2O$ production in the $CO_2/H_2O/NO$ system is only 0.74 μmol/g-catalyst. This result suggests that the P25 $TiO_2$ surface is not as effective as compared to the Cu—$TiO_2$ surface in enhancing the CO reaction with NO to form $N_2O$. Instead, with the P25 $TiO_2$ system, a portion of the CO readily desorbs from the surface and is measured in the gas-phase. The current results are consistent with previous studies that suggest that CO assists in the reduction of NO to $N_2O$ over commercial P25 $TiO_2$, but extend the previous results to the Cu—$TiO_2$ catalyst.

It should also be noted that in the presented reaction pathway, both Langmuir-Hinshelwood and Eley-Rideal mechanisms apply due to the reaction of adsorbed and gas-phase species. The possible reaction pathways during the $CO_2$ reduction process in the presence of $H_2O$ and NO are also included in Table 2. It is purported that adsorbed CO formed from $CO_2$ photoreduction by $H_2O$ initiates another reaction involving adsorbed NO molecules. Reaction (15) in Table 2 suggests that the presence of CO helps to reduce NO to $N_2O$. This mechanism aligns with the results displayed in FIG. 9, where the Cu—$TiO_2$ catalyst exhibits significant $N_2O$ production.

TABLE 2

Photocatalyst Activation

| | |
|---|---|
| $TiO_2 + h\nu \rightarrow e^- + h^+$ | (1) |

NO Photoreduction Mechanism

| | |
|---|---|
| $NO_{(ads)} + e^- \rightarrow NO^-_{(ads)}$ | (2) |
| $O^{2-}_{(cus)} + h^+ \rightarrow O^-_{(cus)}$ | (3) |
| $NO^-_{(ads)} + NO_{(gas)} \rightarrow N_2O_{(gas)} + O^-_{(cus)}$ | (4) |
| $O^-_{(cus)} + NO_{(gas)} + \rightarrow NO_2^-_{(ads)}$ | (5) |
| $NO^-_{(ads)} + O^-_{(cus)} \rightarrow N_{(ads)} + O_{(ads)} + O^{2-}_{(cus)}$ | (6) |
| $NO_{(ads)} + N_{(ads)} \rightarrow N_2O_{(ads)}$ | (7) |
| $NO_{(ads)} + O_{(ads)} \rightarrow NO_{2(ads)}$ | (8) |
| $2O_{(ads)} \rightarrow O_{2(gas)}$ | (9) |
| $2N_{(ads)} \rightarrow N_{2(gas)}$ | (10) |
| $2NO_{(ads)} \rightarrow N_{2(gas)} + O_{2(gas)}$ | (11) |

$CO_2$ Photoreduction Mechanism

| | |
|---|---|
| $2H_2O_{(ads)} + 4h^+ \rightarrow 4H^+ + O_{2(gas)}$ | (12) |
| $4H^+ + 4e^- \rightarrow 2H_{2(gas)}$ | (13) |
| $CO_{2(ads)} + 2H^+ + 2e^- \rightarrow CO_{(ads)} + H_2O_{(ads)}$ | (14) |
| $2NO_{(ads)} + CO_{(ads)} \rightarrow N_2O_{(gas)} + CO_{2(gas)}$ | (15) |

Thus, the systems and methods described herein enable the photoreduction of $CO_2$ and NO in post-combustion streams. Additionally, the photoreduction of $CO_2$ and NO can enable the generation of CO and $N_2O$, which may be harvested for use in other industries. The technology includes a method for simultaneous carbon dioxide and nitric oxide control that is highly efficient, particularly for nitric oxide conversion. Chemical products are created in the control process that can enable industries to enhance their efficiencies (thus addressing the new US Environmental Protection Agency's new Carbon Rule) and increase profitability while simultaneously enhancing environmental stewardship.

The technology has the potential to control NO using light and an inexpensive photocatalyst. This may result in cost savings and easier operations. One product of the NO control using the technology is nitrous oxide, a chemical that can be sold to the semiconductor industry or sold to gas companies for purification and subsequent use by the medical industry. Different amounts of the nitrous oxide can be generated based on the catalyst that is used (either $TiO_2$ or Cu—$TiO_2$). The technology can simultaneously avoid the direct release of $CO_2$ to the atmosphere by converting the $CO_2$ to CO. Advantages over current technology include: (1) light is used to activate the catalyst; (2) the chemicals are relatively inexpensive; and (3) the photocatalytic approach can also be used to treat $CO_2$ and convert this to CO or potentially other carbon containing species.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A photoreduction system for a fluid stream, the fluid stream including at least carbon dioxide and nitric oxide therein, the photoreduction system comprising:
   a catalyst arranged such that the fluid stream flows over a surface region of the catalyst;
   a light source configured to illuminate the surface region of the catalyst;
   wherein when the light source illuminates the surface region of the catalyst, a concentration of the carbon dioxide and a concentration of the nitric oxide in the fluid stream are reduced as the fluid stream flows over the surface region, wherein when the concentration of the nitric oxide is reduced as the fluid stream flows over the surface region, nitrous oxide is generated, and wherein the catalyst comprises copper modified titanium dioxide, and wherein the fluid stream includes water such that an amount of the nitrous oxide generated is a factor of 4 to 5.46 increase compared to the photoreduction system using a fluid stream having nitric oxide but without water and carbon dioxide, when measured in a photoreactor using operating conditions of carbon dioxide with water at a relative humidity of 70% and having nitric oxide but without water and carbon dioxide, an initial concentration of carbon dioxide ranging between 3.0-4.0% by volume, an initial concentration of nitric oxide ranging between 0.0610-0.0819% by volume, the same mass of the catalyst, and room temperature.

2. The photoreduction system of claim 1, wherein the titanium dioxide has a band gap energy between 2 and 5 eV.

3. The photoreduction system of claim 1, wherein a band gap energy of the titanium dioxide is between 2.5 and 4.5 eV.

4. The photoreduction system of claim 1, wherein a band gap energy of the titanium dioxide is between 3 and 3.5 eV.

5. The photoreduction system of claim 1, wherein the titanium dioxide comprises a phase selected from the group consisting of anatase, brookite, rutile, and mixtures thereof.

6. The photoreduction system of claim 1, wherein the phase of the titanium dioxide comprises a mixture of anatase and rutile.

7. The photoreduction system of claim 1, wherein the copper modified titanium dioxide is formed from reaction of a copper-containing compound and titanium dioxide particles having a mean diameter in a range of 10 to 50 nanometers.

8. The photoreduction system of claim 1, wherein the copper modified titanium dioxide is formed from reaction of a copper-containing compound and titanium dioxide particles having a mean diameter in a range of 10 to 30 nanometers.

9. The photoreduction system of claim 1, wherein the copper modified titanium dioxide has a copper content in a range of 0.01 to 5 wt. %.

10. The photoreduction system of claim 1, wherein the copper modified titanium dioxide has a copper content in a range of 0.1 to 1 wt. %.

11. The photoreduction system of claim 1, wherein the copper modified titanium dioxide has a copper content in a range of 0.2 to 0.8 wt. %.

12. The photoreduction system of claim 1, wherein the light source is configured to emit ultraviolet radiation.

13. The photoreduction system of claim 1, wherein the catalyst consists essentially of copper modified titanium dioxide.

14. The photoreduction system of claim 1, wherein the conversion of nitric oxide in the fluid stream is greater than 50%.

15. The photoreduction system of claim 1, wherein the yield of nitrous oxide in the fluid stream is greater than 4%.

16. The photoreduction system of claim 1, wherein the fluid stream includes flue gas.

* * * * *